United States Patent
Hughes, Sr. et al.

(10) Patent No.: US 6,732,673 B2
(45) Date of Patent: *May 11, 2004

(54) DRIVABLE POST AND MARKER

(75) Inventors: Robert K. Hughes, Sr., Fort Meyers, FL (US); Robert K. Hughes, Jr., Fort Meyers, FL (US)

(73) Assignee: Flexstake, Inc., Fort Meyers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/357,082

(22) Filed: Feb. 3, 2003

(65) Prior Publication Data

US 2003/0159639 A1 Aug. 28, 2003

Related U.S. Application Data

(63) Continuation-in-part of application No. 10/086,235, filed on Feb. 27, 2002, now Pat. No. 6,604,485.

(51) Int. Cl.⁷ ............................................. G01D 21/00
(52) U.S. Cl. .................... 116/209; 116/200; 52/155; 52/156
(58) Field of Search ................ 116/200, 209; 52/155, 156, 158, 160, 165

(56) References Cited

U.S. PATENT DOCUMENTS

| | | | | |
|---|---|---|---|---|
| 444,331 A | * | 1/1891 | Christ ........................ 52/156 |
| 3,371,647 A | * | 3/1968 | Shopbell ..................... 116/209 |
| 3,621,806 A | * | 11/1971 | Brown ........................ 52/160 |
| 3,991,976 A | * | 11/1976 | Skinner ....................... 254/30 |
| 4,862,823 A | | 9/1989 | Hughes |
| 5,009,394 A | * | 4/1991 | Marshall ...................... 254/30 |
| 5,104,265 A | * | 4/1992 | Halloran, Jr. ................. 52/165 |
| 5,396,743 A | * | 3/1995 | Bellette ....................... 52/155 |
| 5,515,645 A | * | 5/1996 | Gober ......................... 52/156 |
| 5,568,785 A | * | 10/1996 | Hazen ........................ 116/209 |

* cited by examiner

Primary Examiner—Diego Gutierrez
Assistant Examiner—Amanda J Hoolahan
(74) Attorney, Agent, or Firm—Bracewell & Patterson, L.L.P.

(57) ABSTRACT

An anchor system for flexible marker posts comprises an anchor that receives a post before the anchor is driven into the ground. In one version of the anchor system, a V-shaped configuration folded along two longitudinal side axes and one lower lateral axis. This version has front and rear plates, and the rear plate has and combines with two flanges to define a narrow pocket that receives the post. The post is secured in the pocket by deforming the pocket with punches. The anchor is retained in the earth by mechanical interference and friction. Additional embodiments include plates that are pre-bent into a V-shape, tabs for maintaining separation of the plates, and a one-piece anchor having a V-shaped lower portion and coplanar, horizontal, upper surfaces connected to the upper edges of the lower portion.

18 Claims, 6 Drawing Sheets

DRIVABLE POST AND MARKER

This patent application is a continuation-in-part of U.S. patent application Ser. No. 10/086,235, filed Feb. 27, 2002, now U.S. Pat. No. 6,604,485 entitled "Drivable Post and Marker," and is incorporated herein by reference.

BACKGROUND OF THE INVENTION

1. Field of the Invention

The present invention relates generally to installation of flexible marker posts and, more specifically, to anchor systems for retaining the posts in earth.

2. Description of the Related Art

Markers are often used in places, such as along roadsides, where there is a likelihood that the mark will be struck or hit by a passing object. Because of the costs of replacing damaged markers, the markers are preferably constructed so that they can withstand the force imparted by passing objects without being severely damaged. Markers are also widely used on playing fields, earthen fields, and grassy areas to mark boundaries, mark locations, or provide information. They may be used on football fields, soccer fields, baseball fields, golf courses, running tracks and trails, public parks, and private lawns.

Typical flexible posts have been constructed to have a base attached to the support surface and having the post mounted on the base. For example, U.S. Pat. No. 4,862,823 shows posts in which an elastomeric element connects a marker post to a base or support, enabling the post to bend relative to the base at the elastomeric element when struck. However, installation of a base adds additional cost to the post and increases installation time. Therefore, there is a need for anchor systems and a method of use for providing inexpensive, easy, and quick installations of flexible marker posts.

BRIEF SUMMARY OF THE INVENTION

An anchor system for flexible marker posts comprises an anchor that receives a post before the anchor is driven into the ground. In a first embodiment, a flat, rectangular plate of mild steel is folded into a U-shape with parallel upper and lower plates. The lower end of a post is placed with the anchor, and the anchor is driven into the earth with a bladed driver, the anchor bending along an axis defined by the blade of the driver. The anchor retains the post with friction, and the anchor is retained in the earth by mechanical interference and friction.

A second embodiment of the invention provides for a two-piece anchor comprising two flat plates. The lower end of the post is placed between the plates, and the anchor is then driven into the ground with a bladed driver.

A third embodiment of the invention also uses a two-piece anchor, though the plates of the anchor are pre-bent during manufacture. The upper plate has tabs that pierce the post during installation, the post sliding upward on the tabs as the anchor is driven into the earth. The lower end of the tabs are in metal-to-metal contact with the lower plate, and the tabs secure the post within the anchor.

A fourth embodiment of the invention is a flat steel plate folded along three longitudinal axes to form a V-shaped lower section and horizontal surfaces at the upper portion of the lower section. The lower portion and surfaces form an enclosure that receives the post, then the anchor is driven into the earth with the blade along a lateral line.

A fifth embodiment of the invention is a V-shaped configuration folded along two longitudinal side axes and one lower lateral axis. This version has front and rear plates, and at least the rear plate has and combines with two flanges to define a narrow pocket that receives the post. The post may be optionally secured in the post anchor by deforming the pocket with punches.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

FIGS. 1 through 7 show three embodiments of an anchor system for a flexible marker post installed in the ground. The posts are used primarily along roadways to mark the edges of lanes or for other forms of traffic control. Though not required, the anchor systems are preferably installed in a pre-dug hole and rely on friction with the ground and the weight of dirt filled into the hole above the installed anchor to hold the post and anchor in place. The components of each system are made from sheet steel and may be flat or bent. This system provides a simple installation method and protects the lower end of the post while it is being installed.

Figure 1:
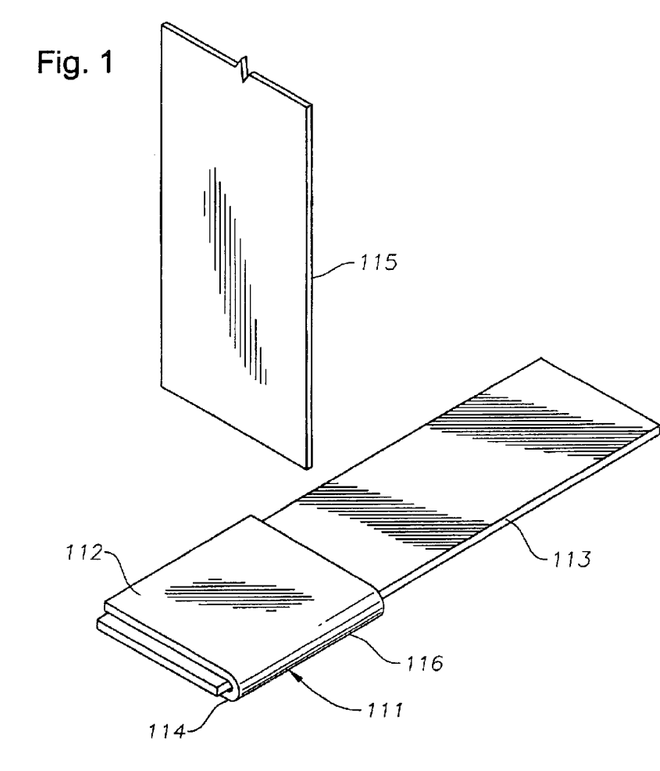
FIG. 1 is a perspective view of a three-piece drivable anchor system for installing a marker post in the ground and shown prior to installation, the anchor system being constructed in accordance with the present invention.
Figure 2:
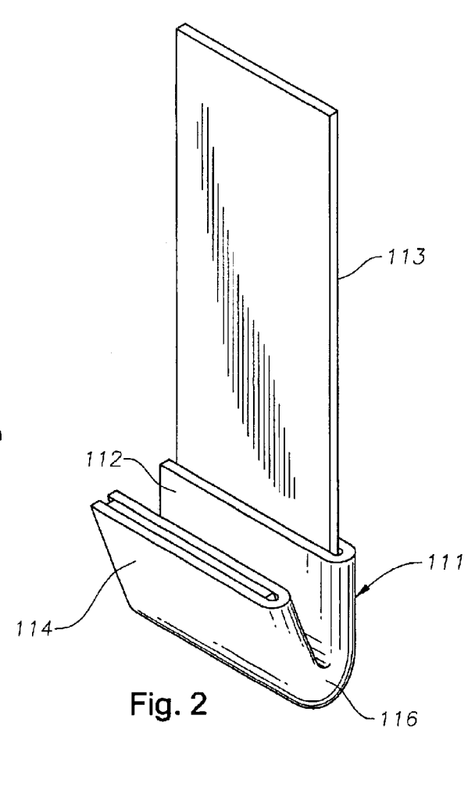
FIG. 2 is a perspective view of the post guide and post from FIG. 1, the post guide having been bent.

FIGS. 1 and 2 depict a three-piece flat anchor system comprising a post anchor 111 having a U-shaped cross-section, a plastic post 113, and a tool or driver 115 for installing post 113 and anchor 111 into the ground. Post anchor 111 is preferably formed by bending a wide, rectangular sheet of steel along its central longitudinal axis to form the U-shape. Post anchor 111 has an upper surface 112, a lower surface 114, and bent side edge 116. The other side edge of anchor 111 is open. Plastic post 113 is rectangular and has a width in one embodiment that is ¼" to ½" narrower than post anchor 111. Post 113 is flexible and is formed of an elastomeric material. The inner and outer surfaces of anchor 111 surround the lower portion of post 113. Post 113 is a preferably-flat strip having a width greater than its thickness. Driver 115 is a long, flat, rectangular plate also preferably made of steel and which is narrower than post anchor 111, but any tool with a flat lower edge, preferably measuring a minimum of 4" by ¼", can be used to drive the anchor system into the ground.

The post 113 may be installed in the ground with one of several different methods, depending primarily upon the hardness of the ground and the tool used to install the post. For example, if the post 113 is being installed in soft earth, no hole or pre-hole is required, even if a manual installation driver 115 is used. If the post 113 is being installed in a harder or more dense material or soil, a pre-hole may need to be formed with the driver 115 prior to installation. If the soil is rocky, paved, or otherwise very hard and/or dense, an automated pneumatic device, such as a jackhammer (not shown), is recommended to install the post 113.

In some instances, a hole may be dug having a width of approximately 4" and a depth of about 18" for the above-dimensioned post anchor 111. The full width of the lower end of plastic post 113 is inserted into the open edge of post anchor 111, and the assembled post anchor 111 and post 113 are laid across the hole, the width and length of post anchor 111 being centered over the hole. Post 113 should be oriented so that it faces the desired direction after installation. The flat lower end of driver 115 is placed against the top of upper surface 112 of post anchor 111, and driver 115 is forced downward to push the assembly into the hole. As post anchor 111 is driven into the hole, the force of the ground opposing the insertion causes the two longitudinal ends to bend upward around a generally-central lateral axis, as shown in FIG. 2, the axis defined by the position of the lower edge of driver 115. The lower portion of post 113 bends with post anchor 111 as it is sandwiched between surfaces 112, 114. This causes post 113 to stand upright and in the correct position once post anchor 111 has been driven into the hole.

Figure 8:
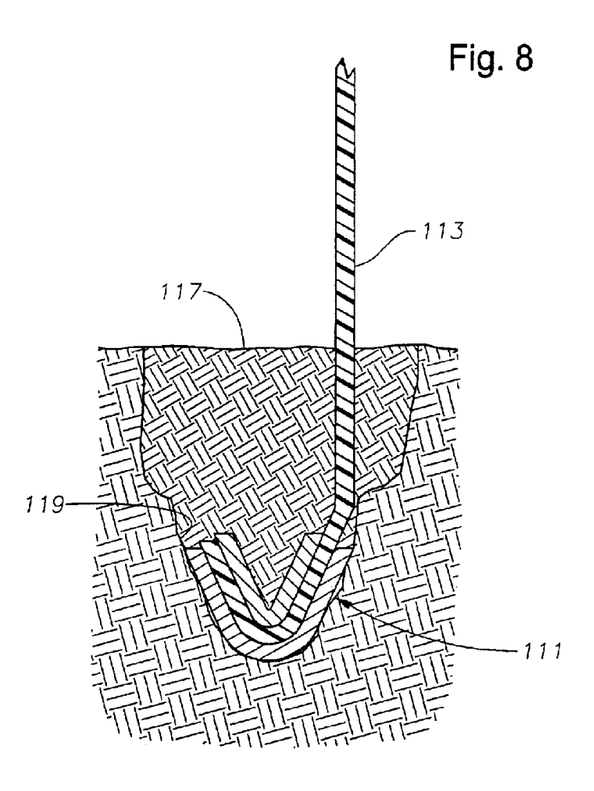
FIG. 8 is a cross-sectional view of the anchor system of FIG. 1 installed in the ground.

To complete the installation, driver 115 is removed, and the hole is filled by placing dirt 117 on top of post anchor 111 as shown in FIG. 8. The friction between post 113 and the inner surface of post anchor 111 retains post 113 within post anchor 111. The weight of dirt 117, the friction between the outer surface of post anchor 111 and walls 119 of the hole, and the angle of the longitudinal ends of post anchor 111 relative to vertical walls 119 of the hole combine to retain post anchor 111 in the ground.

Post anchor 111 can be bent along a central lateral axis during fabrication or prior to installation to produce a V-shape as shown in FIG. 2. This would ease alignment and initial insertion, but would require an additional step in manufacturing post anchor 111.

Figure 3:
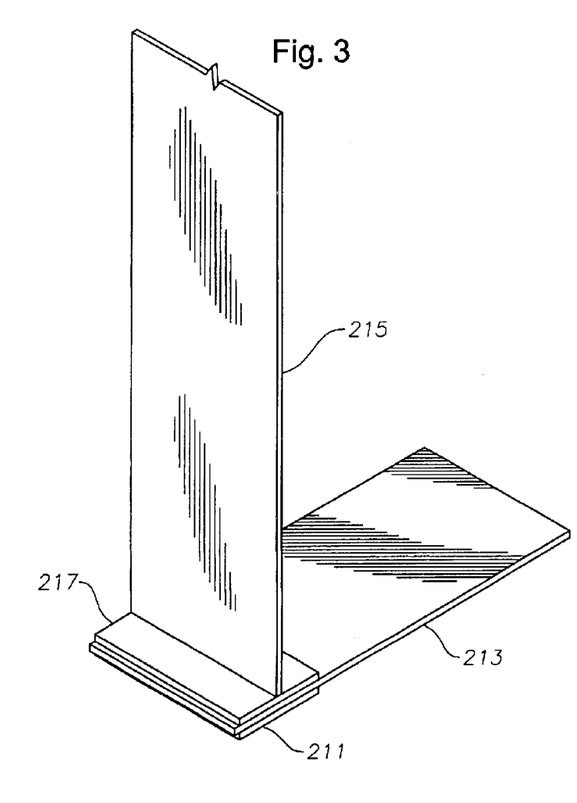
FIG. 3 is a perspective view of a second embodiment of an anchor system for installing a marker post in the ground and shown prior to installation, the anchor system being constructed in accordance with the present invention.
Figure 4:
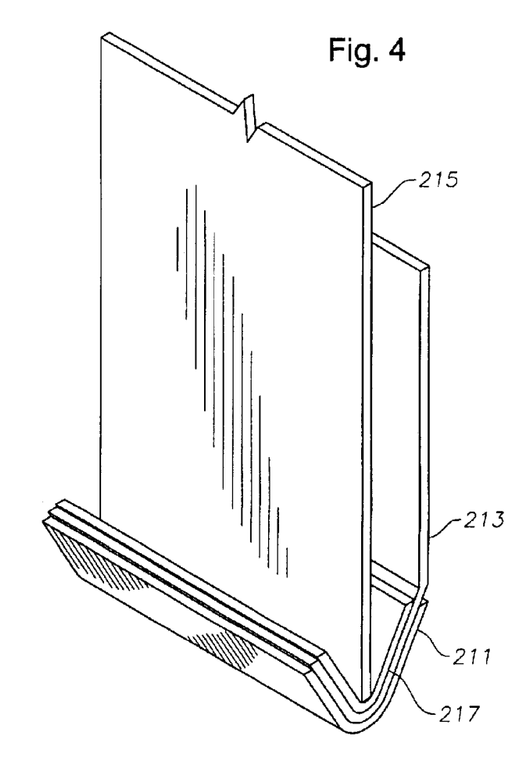
FIG. 4 is a perspective view of the anchor system of FIG. 3 with the post guide and insert being bent and the driver positioned for installation of the anchor system.

A second embodiment of the anchor system is shown in FIGS. 3 and 4. This system is a four-piece flat design comprising a post guide 211, a post 213, a driver 215, and an insert 217. Post guide 211 and insert 217 are flat, rectangular sheets of steel with a horizontal area approximately equal to that of post anchor 111 shown in FIGS. 1 and 2. Driver 215 is the same as that in the first embodiment, and installation follows the same procedure as described above. Post guide 211 and insert 217 are placed on opposite sides of a lower portion of post 213. As shown in FIG. 4, these components also may be bent along a central lateral axis prior to insertion in the ground, forming a V-shaped trough having upward-and-outward-extending legs.

Figure 5:
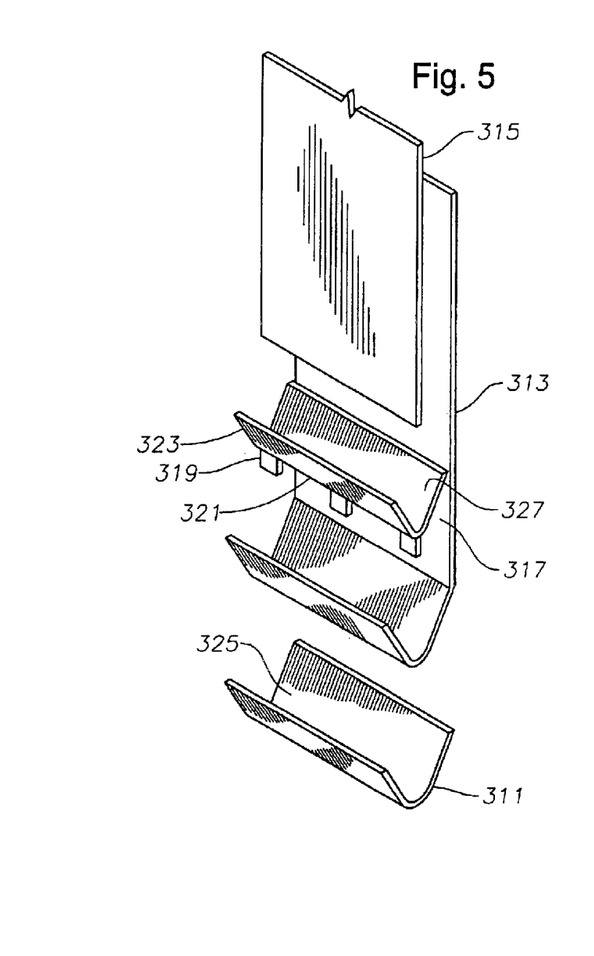
FIG. 5 is an exploded perspective view of a third embodiment of an anchor system for installing a marker post in the ground, the anchor system being constructed in accordance with the present invention.
Figure 6:
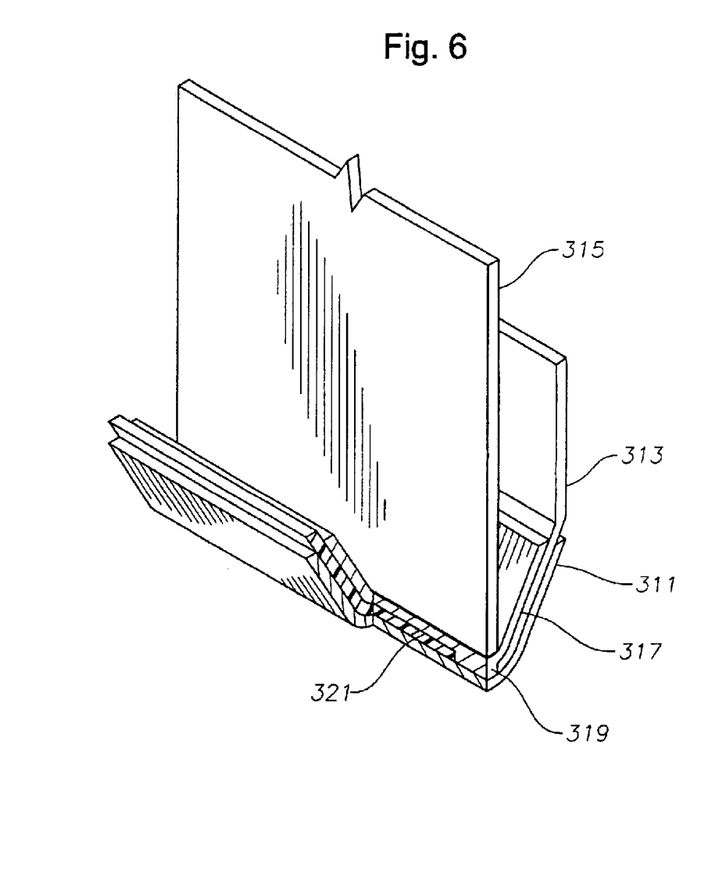
FIG. 6 is a partially-sectioned perspective view of the anchor system of FIG. 5 showing the position of the components during installation.

FIGS. 5 and 6 show a third embodiment of the present invention comprising four pieces. Shown in FIG. 5 are rectangular tabs 319 depending from the lower surface of insert 317 along the central lateral axis. Insert 317 and post guide 311 are preferably bent during fabrication or prior to installation to assist in aligning the components to each other and to reduce the possibility that tabs 319 will be bent during installation. The lower end of plastic post 313 is positioned in post guide 311, and insert 317 is placed onto the upper surface of the post 313 with tabs 319 in contact with post 313. Tabs 319 cut through plastic post 313 as the assembly is driven into the ground, and post 313 slides upward into notches 321 between tabs 319. This provides a metal-to-metal contact between tabs 319 and post guide 311 and protects post 313 from being damaged by the force between a lower surface 323 of insert 317 and an upper surface 325 of post guide 311. Tabs 319 do not extend through post guide 311.

Installation using a pre-bent anchor system is similar to that of the systems using flat components. Post guide 311 is inserted into the hole with the V-shape opening upward and the lateral axis perpendicular to the desired direction to which a front side of post 313 will be exposed. The lower end of post 313 is lowered into the hole and inserted in post guide 311. Insert 317 is placed into the hole and onto post 313 with the same orientation as post guide 311. The lower edge of driver 315 is placed against the vertex of the V-shape on an upper surface 327 of insert 317 with the lateral axis of driver 315 being parallel to that of insert 317. Driver 315 is forced downward to push the assembly into the ground.

Figure 7:
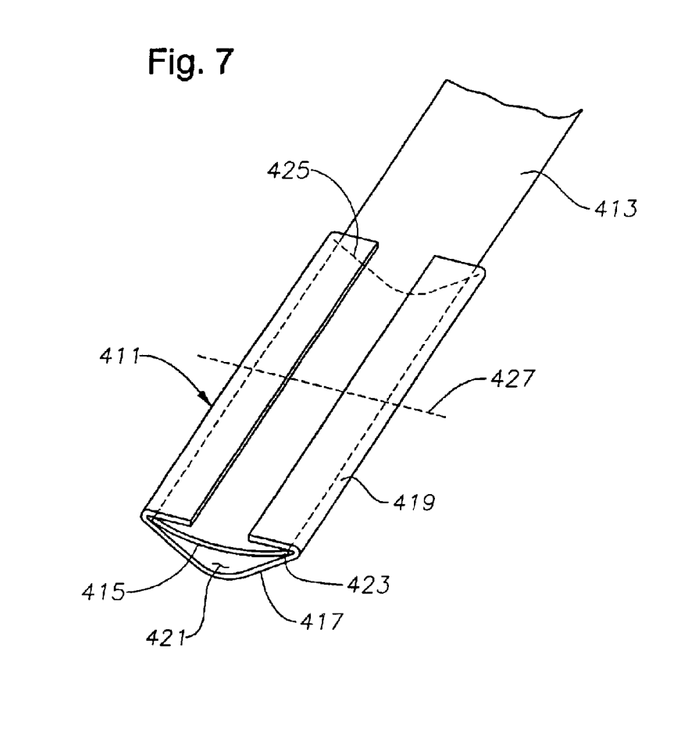
FIG. 7 is a perspective view of a fourth embodiment of an anchor system for installing a marker post in the ground, the anchor system being constructed in accordance with the present invention.

A fourth embodiment of an anchor system of the invention is shown in FIG. 7. This system is a three-piece design comprising a post anchor 411, a post 413, and a driver (not shown). Post 413 is shown as having a curved front surface 415, though post 413 may alternatively have a flat front surface 415. Post anchor 411 is a rectangular sheet of preferably mild steel that is bent along three longitudinal axes to form a V-shaped lower portion 417 and coplanar, horizontal, longitudinal surfaces 419 connected along the upper edges of lower portion 417. The V-shape of lower portion 417 is a trough having upward-and-outward-extending legs, the trough opening upward. Surfaces 419 extend inward from the upper edges of lower portion 417 and toward each other. In this embodiment, surfaces 419 do no touch each other, but surfaces 419 and lower portion 417 partially surround an enclosure 421 having open ends 423, 425 and being sized for receiving post 413.

To install post 413 using post anchor 411, post 413 is inserted into enclosure 421. A pilot hole is created in the earth as described above, then anchor 411 is placed over the hole, anchor 411 being generally centered over the hole. A flat-bladed driver, such as that shown in previously-described embodiments, is used to drive anchor 411 into the earth. For best results, the blade of the driver preferably contacts anchor 411 approximately along line 427. As anchor 411 is driven into the earth, the longitudinal ends of anchor 411 are bent upwards around line 427 (or wherever the blade of the driver contacts anchor 411), producing a V-shape having a lateral axis, and post 413 assumes a vertical orientation. As described above, friction between post 413 and the inner surfaces of anchor 411 retains post 413 within anchor 411, and mechanical interference and friction with the earth retains anchor 411 within the hole.

Figure 9:
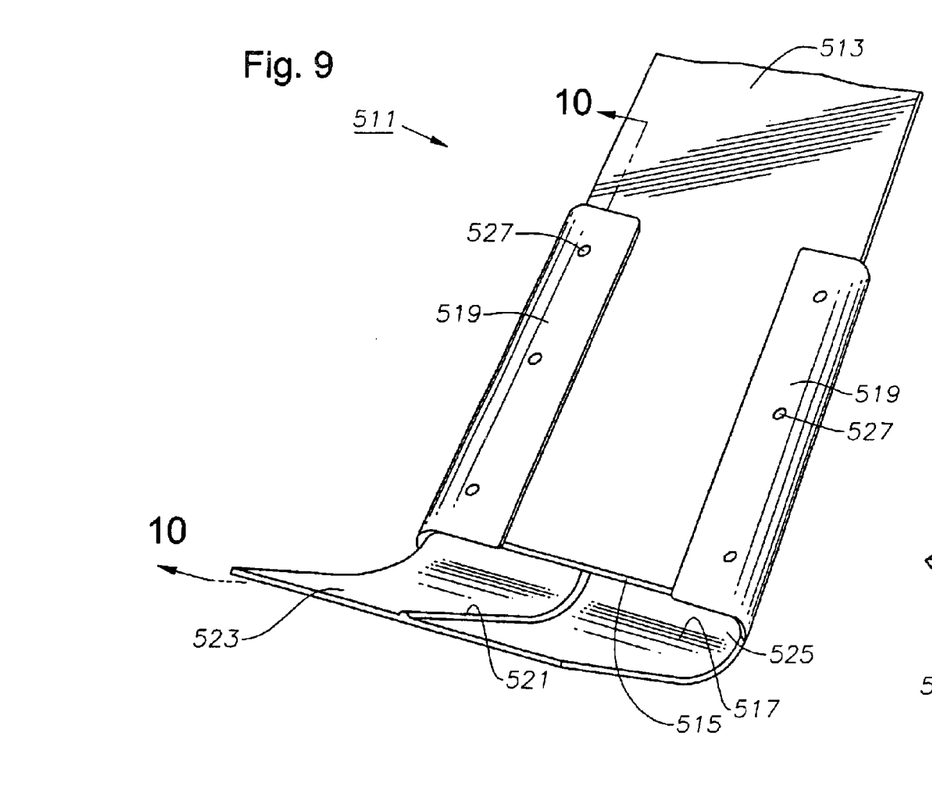
FIG. 9 is a perspective view of a fifth embodiment of an anchor system for installing a marker post in the ground, the anchor system being constructed in accordance with the present invention.
Figure 10:
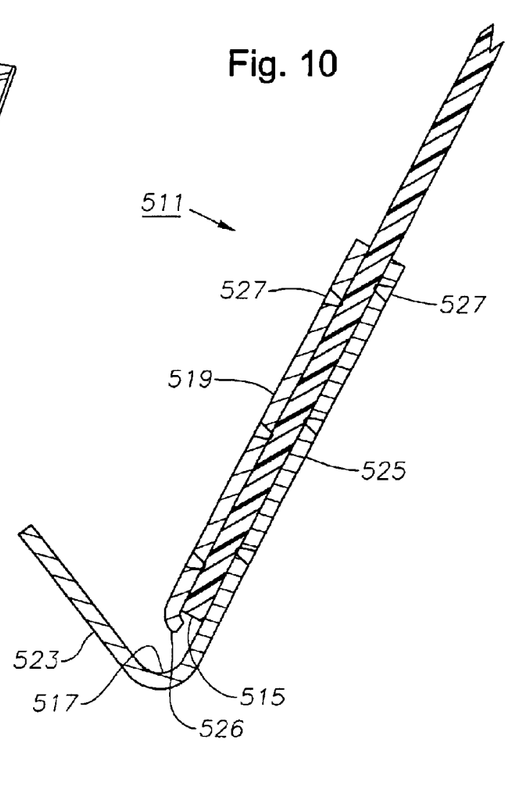
FIG. 10 is a cross-sectional view of the anchor system of FIG. 9 taken along the line 10—10 of FIG. 9.

A fifth embodiment of an anchor system of the invention is shown in FIGS. 9 and 10. This system is also a three-piece design comprising a post anchor 511, a post 513, and a driver or automated device (not shown). In one version of this embodiment, the respective materials used to form post anchor 511 and post 513 are designed to be heavier gauges and more resilient (e.g., steel and fiberglass/plastic). Post 513 is shown as having a lower end 515, and post anchor 511 is a generally rectangular structure of preferably mild steel that is pre-bent along two longitudinal portions and one lateral portion. The resulting configuration is generally V-shaped with a vertex 517 and coplanar, longitudinal flanges 519 extending upward from just above vertex 517.

Resilient front and rear plates 523, 525 extend upward from vertex 517. Flanges 519 are integrally formed with and extend from rear plate 525 toward each other but do not touch. A thin retention sleeve or pocket is defined between rear plate 525 and flanges 519 and is sized to receive the post 513. The lower ends of the flanges 519 may be pinched to form a seat 526 upon which the lower edge of post 513 abuts. Post anchor 511 also may be provided with an optional small, bisecting, longitudinal ridge 521 that is located on rear plate 525, vertex 517, and front plate 523. Ridge 521 is centrally located between flanges 519 for additional strength.

To install post 513 using post anchor 511, the lower end 515 of post 513 is inserted into the pocket defined between flanges 519 and rear plate 525. Post anchor 511 is then punch pressed or similarly deformed at several locations on flanges 519 and/or rear plate 525, such as those indicated at deformations 527. Deformations 527 ensure retention of post 513 in post anchor 511 by penetrating portions of the rear plate 525 and the flanges 519 into the post 513.

As described above, no hole, a pilot hole, or an anchor-sized hole is created in the earth, and anchor 511 is placed at the burial site or over or in the hole, with anchor 511 being generally centered in the hole. With this embodiment of the present invention, a pneumatic tool, such as a jack hammer, may be used to drive anchor 511 into the earth. However, a flat-bladed driver, such as that shown in previously-described embodiments, can be used to drive anchor 511 into the earth. For best results, the blade of the driver preferably contacts anchor 511 approximately along vertex 517. As anchor 511 is driven into the earth, the front and rear plates 523, 525 of anchor 511 may deflect toward each other about vertex 517, and post 513 assumes a vertical orientation as it extends above the earth. As described above, mechanical interference and friction with the earth retains anchor 511 within the hole. However, because post 513 is mounted to post anchor 511 in the manner described above, post 513 is not deformed or bent other than the slight perforations or indentations caused by deformations 527. Thus, post 513 retains its substantially linear configuration even after it is installed in the earth with post anchor 511. This design allows post 513 to be formed from materials that are much more rigid and less flexible than those used for the posts described above for the other embodiments.

Figure 11:
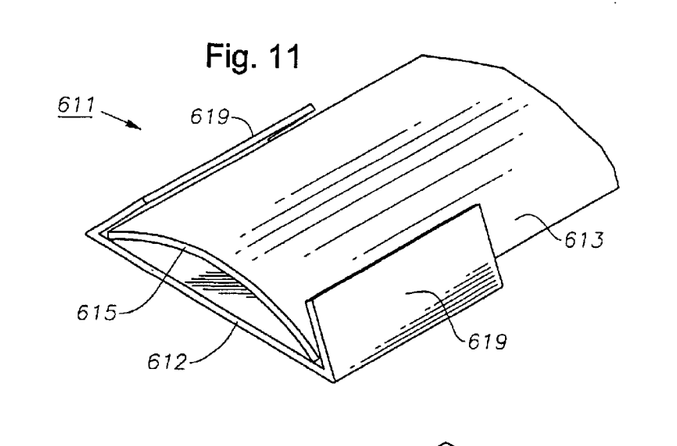
FIG. 11 is a perspective view of a modified version of the anchor system of FIG. 9 prior to deformation of the post anchor.
Figure 12:
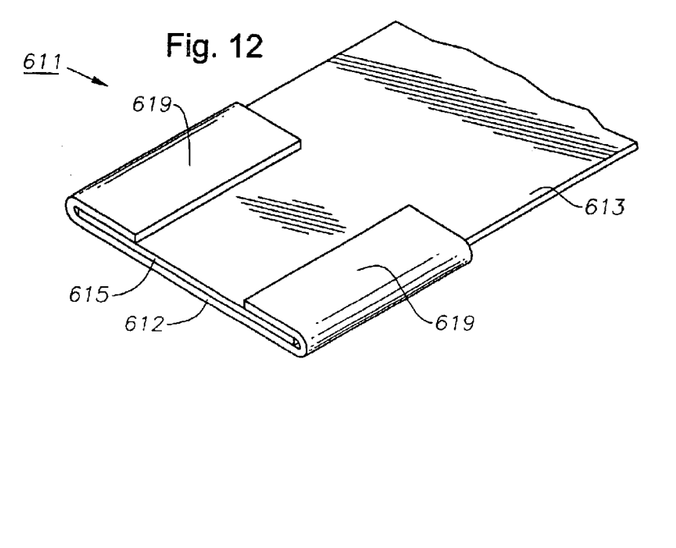
FIG. 12 is a perspective view of the anchor system of FIG. 9 after deformation of the post anchor.
Figure 13:
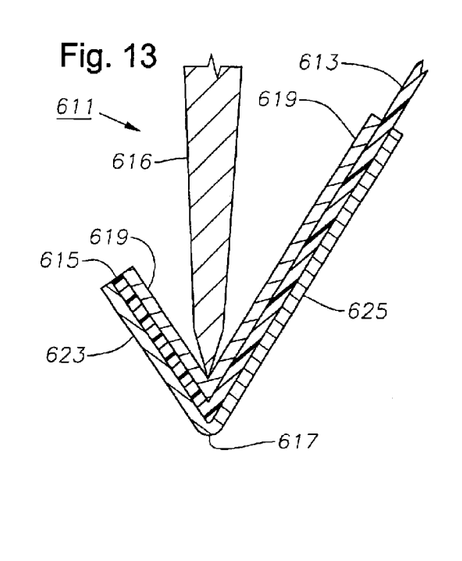
FIG. 13 is a cross-sectional view of the anchor system of FIG. 9 during installation in the earth.

Referring now to FIGS. 11–13, a sixth embodiment of an anchor system of the present invention is shown, comprising a post anchor 611, a post 613, and a driver or automated device 616 (see FIG. 13). This embodiment is very similar to the fifth embodiment of FIGS. 9 and 10, except that the flanges 619 of the post anchor 611 extend from end to end, and the post anchor 611 initially has a generally flat configuration, rather than a preformed V-shaped configuration.

Initially, the post anchor 611 is undeformed (FIG. 11) such that a pair of flanges 619 extend from its substantially planar base 612 at acute angles as shown. Post 613 is inserted into a pocket of the undeformed post anchor 611 such that a lower end 615 of post 613 substantially aligns with one end of the post anchor 611. The flanges 619 are then deformed or bent down toward each other and onto the post 613 as shown in FIG. 12, to permanently retain the post 613 in the post anchor 611 and form an assembly. This process may include puncture deformations, as previously described above.

The assembly is installed in the ground in a manner similar to that described above. Since the assembly is flat, it is simply placed on the ground at the point of insertion. A small pilot hole or a larger hole may be formed if necessary to penetrate the ground. However, in most instances, no hole of any type will be required. The assembly is struck with a driver 616 or other tool (FIG. 13) and driven into the ground. As the assembly is installed, it forms a V-shaped configuration having a vertex 617, a front plate 623, and a rear plate 625. Note that in this version, the flanges 619 are also formed in the V-shape opposite front and rear plates 623, 625.

The invention provides for several advantages. Using the anchor systems of the invention makes the installation of flexible posts both easy and quick, typically allowing one person to install a post in less than two minutes. Since the anchor systems are hidden underground, they are tamper resistant. The anchor systems also provide an installation that strongly resists the post being pulled out of the ground.

While the invention has been shown in only some of its forms, it is not thus limited but is susceptible to various changes and modifications without departing from the spirit thereof. For example, in some cases, sufficient force may be applied by the driver to insert the anchor and lower end of the post into the ground without digging a hole in advance. Also, posts could be automatically installed from a vehicle that continuously moves along the desired path.

We claim:

1. A marker, comprising:

a post;

a post anchor having a vertex, a front plate, and a rear plate, the front and rear plates extending from the vertex to define a general V-shape of the post anchor after installation, the rear plate having a pair of flanges such that a pocket is defined between the rear plate and the flanges and is sized to receive the post; and a portion of post is located in the pocket.

2. The marker of claim 1, further comprising a set of deformations in the post anchor for retaining the post in the pocket.

3. The marker of claim 2, wherein the deformations in the set of deformations comprises punches in the rear plate and the flanges that penetrate portions of the rear plate and the flanges into the post.

4. The marker of claim 1, further comprising a bisecting, longitudinal ridge formed on the front plate, the vertex, and the rear plate, the ridge being centrally located between the flanges for strengthening the post anchor.

5. The marker of claim 1, wherein the post has a lower edge and the flanges have lower ends that are pinched to form a seat which abuts the lower edge of the post.

6. The marker of claim 1, wherein the vertex extends in a lateral direction and the flanges extend in a longitudinal direction that is transverse to the lateral direction.

7. The marker of claim 1, wherein the flanges are coplanar and extend toward each other and are located adjacent to the vertex.

8. A marker, comprising:

a post having a linear configuration and a lower end;

a post anchor having a vertex extending in a lateral direction, a front plate, and a rear plate, the front and rear plates extending from the vertex to define a general V-shape of the post anchor after installation, the rear plate having a pair of coplanar flanges formed in a longitudinal direction that is transverse to the lateral direction, and the flanges extending toward each other and located adjacent to the vertex, such that a pocket is defined between the rear plate and the flanges and is sized to receive the lower end of the post; and the lower end of the post is located in the pocket such that the post retains the linear configuration.

9. The marker of claim 8, further comprising a set of deformations in the post anchor for retaining the post in the pocket.

10. The marker of claims 9, wherein the deformations in the set of deformations comprise punches in the rear plate and the flanges that penetrate portions of the rear plate and the flanges into the post.

11. The marker of claim 8, further comprising a bisecting, longitudinal ridge formed on the front plate, the vertex, and the rear plate, the ridge being centrally located between the flanges for strengthening the post anchor.

12. The marker of claim 8, wherein the lower end of the post has a lower edge and the flanges have lower ends that are pinched to form a seat that abuts the lower edge of the post.

13. A marker, comprising:

a post having an end;

a post anchor having a substantially planar base with two ends, a pair of flanges extending from the base at acute angles to form a V-shape of the post anchor after installation over the base from end to end to define a pocket between the base and the pair of flanges and is sized to receive the post; and a portion of post is located in the pocket and the end of the post is substantially aligned with one of the ends of the post anchor such that the flanges are deformable to extend toward each other and onto the post to permanently retain the post in the post anchor.

14. A method of installing a marker, comprising:

providing a post having a linear configuration and a post anchor having a pocket;

inserting the post into the pocket of the post anchor;

deforming the post anchor to form a V-shape such that the post is retained in the pocket; and driving the post anchor into the earth such that at least a portion of the post extends from the post anchor above the earth and the post retains its linear configuration.

15. The method of claim 14, wherein the deforming step comprises punch pressing the post anchor such that portions of the post anchor penetrate the post.

16. The method of claim 14, further comprising the step of forming a pilot hole in the earth prior to driving the post anchor into the earth, and then driving the post anchor into the pilot hole such that the post anchor is retained in the earth by mechanical interference and friction.

17. The method of claim 14, wherein the driving step comprises driving the post anchor into the earth with a pneumatic tool.

18. The method of claim 14, wherein the providing step comprises providing the post anchor with a substantially flat configuration, and the deforming step comprises permanently retaining the post in the post anchor, and further comprising the step of laying the post anchor and post on the earth in the substantially flat configuration prior to the driving step, and then deforming the post anchor and the post into a V-shaped configuration.

* * * * *